(12) United States Patent
Hwang et al.

(10) Patent No.: US 7,326,284 B2
(45) Date of Patent: Feb. 5, 2008

(54) CONTAMINATION CONTROL SYSTEM AND AIR-CONDITIONING SYSTEM OF A SUBSTRATE PROCESSING APPARATUS USING THE SAME

(75) Inventors: Tae-Jin Hwang, Yongin-si (KR); Jae-Hyun Yang, Gyeonggi-do (KR); Jung-Sung Hwang, Suwon-si (KR); Hyun-Joon Kim, Anyang-si (KR); Yo-Han Ahn, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/883,584

(22) Filed: Jul. 1, 2004

(65) Prior Publication Data
US 2005/0000243 A1    Jan. 6, 2005

(30) Foreign Application Priority Data
Jul. 3, 2003    (KR) ...................... 10-2003-0044800

(51) Int. Cl.
*B01D 47/00*    (2006.01)
(52) U.S. Cl. ............................. 96/235; 96/240; 96/355
(58) Field of Classification Search ................. 96/235, 96/240, 355; 261/115, 116, 117, 118
See application file for complete search history.

(56) References Cited

U.S. PATENT DOCUMENTS

| | | | | | |
|---|---|---|---|---|---|
| 5,635,149 | A | * | 6/1997 | Klingspor et al. | ..... 423/243.08 |
| 5,648,048 | A | * | 7/1997 | Kuroda et al. | ............... 422/168 |
| 5,681,470 | A | * | 10/1997 | Safi | ............................ 210/603 |
| 6,322,617 | B1 | * | 11/2001 | Wurz et al. | .................... 96/314 |
| 2002/0110500 | A1 | * | 8/2002 | Klingspor et al. | ..... 423/243.08 |
| 2003/0056648 | A1 | * | 3/2003 | Fornai et al. | ................... 95/65 |
| 2003/0094099 | A1 | * | 5/2003 | Lin et al. | ....................... 95/149 |
| 2004/0124271 | A1 | * | 7/2004 | Ham et al. | .................. 239/461 |
| 2004/0163941 | A1 | * | 8/2004 | Yun | ........................ 204/157.3 |

FOREIGN PATENT DOCUMENTS

JP    08-000951 A    *    1/1996

* cited by examiner

*Primary Examiner*—Frank M. Lawrence
(74) *Attorney, Agent, or Firm*—F. Chau & Associates, LLC.

(57) ABSTRACT

An air-conditioning system of a substrate processing apparatus includes an air inlet line for providing air to a clean room. A contamination control apparatus for removing contaminants in the air is connected to the air inlet line. A controller controls temperature and humidity of the air without the contaminants. An air outlet line provides the air having the controlled temperature and humidity to a substrate processing chamber that is disposed in the clean room. The contamination control apparatus includes a spray unit having at least one nozzle that sprays water. At least one eliminator that traps the water for capturing contaminants in the air and drops the trapped water into a tank. A water circulation unit provides the water that includes an additive for controlling pH of the water to the spray unit.

22 Claims, 16 Drawing Sheets

CONTAMINATION CONTROL SYSTEM AND AIR-CONDITIONING SYSTEM OF A SUBSTRATE PROCESSING APPARATUS USING THE SAME

CROSS-REFERENCE TO RELATED APPLICATION

This application claims priority to Korean Patent Application No 2003-44800, filed on Jul. 3, 2003, which is incorporated herein by reference in its entirety.

BACKGROUND OF THE INVENTION

1. Field of the Invention

The present invention relates, generally, to a contamination control system. More particularly, the present invention relates to a contamination control system for simultaneously and efficiently controlling various contaminants and an air-conditioning system of a substrate processing apparatus using the contamination control system.

2. Description of the Related Art

Generally, a process line for manufacturing a part, for example a semiconductor device or an electronic article, may be contaminated by various contaminants. Even a very small amount of contaminants, such as a unit of parts per billion (ppb), reduces the yield and productivity of semiconductor fabricating equipment. Thus, it is required to provide a gaseous environment having a high degree of purity to the semiconductor fabricating equipment. In particular, as semiconductor devices have become more highly integrated, it is increasing more important to prevent an airborne molecular contamination (AMC), as well as a typical particle contaminates, from contaminating the semiconductor devices during manufacturing. For example, the contaminants including the AMC and the particle may cause the following phenomena: a native oxide layer may be formed on a substrate due to the presence of an ozone contaminate, a photoresist pattern of light amplification type may have a profile having a T-top shape due to the presence of an ammonia contaminate, a critical dimension currently issued in the semiconductor fabricating process may vary, and a tolerance of a gate oxide layer may be deteriorated due to the presence of an organic material.

Accordingly, the semiconductor fabricating process ought to be carried out under a clean atmosphere. The semiconductor fabricating equipment is disposed in a clean room. The semiconductor fabricating equipment is also surrounded by a casing. A clean air supplying apparatus such as a fan filter unit (FFU) is connected to the clean room. The FFU includes a fan and a filter, which are integrated. Processing units of the semiconductor fabricating equipment are disposed under the clean air supplying apparatus so that clean air produced from the clean air supplying apparatus is provided to the processing units. A chemical filter is connected to the clean air supplying apparatus. The chemical filter removes $O_3$, $NH_3$, $SO_x$, $NO_x$ and an organic substance contained in a flow of air that is introduced into the semiconductor fabricating equipment. Conventionally, contamination control has focused on a metal contaminant and a particle contaminant. A conventional air filter may remove a particle having a size of below about 0.1 μm.

However, the chemical filter is very expensive and short-lived. Thus, since the chemical filter is periodically exchanged for a new chemical filter, the running cost of the clean air supplying apparatus increases, thereby increasing the cost of the semiconductor device. Further, since various chemical filters are provided in accordance with various contaminants, maintenance of the chemical filters may be difficult. This causes continuous use of a disabled chemical filter so that trouble may occur in the semiconductor fabricating process. When a new AMC appears, a new chemical filter for removing the new AMC is required, and the cost associated with developing the new chemical filter increases the cost of the new filter needed to remove the new AMC.

Further, the AMC in the clean room, which is referred to as an ambient contamination, may be chemically non-visual. Thus, the AMC may not be studied from the viewpoint of the contamination control technology. Accordingly, a control system for removing the AMC may not be developed.

Meanwhile, methods for removing contaminants in a flow of air using a wet air-conditioning type have been proposed using a water showering system instead of the chemical filter and are disclosed in Korean Patent No. 0340334 and Japanese Patent Laid Open Publication No. 1998-340851.

FIG. 1 is a schematic view illustrating a conventional contamination control system. Referring to FIG. 1, a conventional contamination control system using a water showering system includes a spray unit 10 having a plurality of nozzles that spray water, preferably deionized water, in the form of water droplets, an eliminator 20 for dropping the water droplets by colliding the water droplets against the eliminator 20, and a tank 25 for collecting the dropped water droplets and for containing the collected water droplets until the collected water droplets are provided to the spray unit 10. Air ($A_i$) introduced into the spray unit 10 is changed into clean air ($A_o$) through the eliminator 20. In FIG. 1, dotted arrows represent the direction of the flow of the air and solid arrows represent the directions of the flow of the water in the contamination control apparatus.

The water is introduced into the tank 25 by a pump (not shown). The water is provided to the spray unit 10 through a filter 30. The water rapidly passes through the nozzles and exits the nozzles in the form of a water droplet. The water droplet passes through the eliminator 20 having a porous plate (not shown) to capture contaminants in the air ($A_i$). The water droplet collides with the porous plate and then drops into the tank 25. The water droplet is collected in the tank 25 and remains in the tank 25 until water from the tank 25 is provided to the spray unit 10.

According to the conventional water showering system, the contaminants are removed by adsorbing suspended dust in the water droplet. The more contaminants are captured by the water, the more the water in the tank 25 is contaminated. As a result, when the water continues to circulate, the quality of the water deteriorates. That is, the water becomes as contaminated as the air so that efficiency for capturing the contaminants from the air is reduced. For example, the circulating water may have efficiency for removing below about 60% of $NO_x$, about 50% of an organic substance and about 20% of ozone in the air. Thus, there is a limit to the amount of contaminants that can be removed using the circulating water. In addition, the pH of the circulating water is lowered by the contaminants such that the circulating water having a low pH may not remove the contaminants from the air.

FIGS. 2 and 3 are graphs showing a relation between the pH of the circulating water and the removal efficiency of the water. In the FIGS. 2 and 3, curved lines A1 and B1 represented the pH of the circulating water and curved lines A2 and B2 represented the removal efficiency with respect to $SO_4^{2-}$. It should be noted that the removal efficiency is closely related to the pH of the circulating water.

FIG. 4 is a graph showing variations of the pH of the circulating water with respect to time. It should be noted that the pH of the circulating water was gradually augmented proportional to a lapse of time.

The removal efficiency of the conventional water showering system is shown in following Table 1.

TABLE 1

| | | Removal efficiency (%) | Wind velocity (m/sec) | pH |
|---|---|---|---|---|
| Contaminants | NH3 | 81.00 | 1.28 | 6.17 |
| | NOx | 64.00 | | |
| | SOx | 88.00 | | |
| | Organic | 50.00 | | |
| | Ozone | 16.80 | | |

To prevent the reduction of the removal efficiency of the circulating water, the contaminants are diluted and the pH of the circulating water is maintained. These may be accomplished by continuously providing above about 90% of new water to the tank 25 through a supply line 22 and by also draining the same amount of contaminated water through a drain line 24. However, when an amount of the new water is too much, a load cost and a running cost of the pump 30 increase so that the water showering system has an inferior efficiency. Therefore, the conventional water showering system may not be employed in an air-conditioning system of a piece of equipment used in semiconductor fabrication.

SUMMARY OF THE INVENTION

Exemplary embodiments of the invention include contamination control systems capable of simultaneously removing various contaminants in a flow of air with high removal efficiency by rapidly dissolving the contaminants in circulating water and maintaining the pH of the circulating water.

Exemplary embodiments of the invention further include air-conditioning systems of a substrate processing apparatus capable of providing clean air without contaminants to a substrate processing apparatus by simultaneously controlling the contaminants with high removal efficiency.

More specifically, according to an exemplary embodiment of the present invention, a contamination control system includes a spray unit having at least one nozzle that sprays water. At least one eliminator traps water including captured contaminants from a flow of air, and drops the trapped water into a tank. A water circulation unit provides water that includes an additive for controlling the pH of the water to the spray unit.

According to another exemplary embodiment of the present invention, an air-conditioning system of a substrate processing apparatus includes an air inlet line for providing air to a clean room. A contamination control apparatus for removing contaminants in the air is connected to the air inlet line. A controller controls temperature and humidity of the air without the contaminants. An air outlet line provides air having the controlled temperature and humidity to a substrate processing chamber that is disposed in the clean room. The contamination control apparatus includes a spray unit having at least one nozzle that sprays water, and at least one eliminator that traps water including captured contaminants from a flow of the air, and drops the trapped water into a tank. A water circulation unit provides water that includes an additive for controlling the pH of the water to the spray unit.

According to another exemplary embodiment of the present invention, an air-conditioning system of a substrate processing apparatus includes an outdoor air-conditioning unit having a contamination control apparatus for removing contaminants in outdoor air. A filter filters the outdoor air without the contaminants. A controller controls temperature and humidity of the air without the contaminants. A duct is connected between the contamination control unit and a substrate processing chamber. The contamination control apparatus includes a spray unit having at least one nozzle that sprays water. At least one eliminator traps water including captured contaminants from the air, and drops the trapped water into a tank. A water circulation unit provides water that includes an additive for controlling pH of the water to the spray unit.

According to another exemplary embodiment of the present invention, the additive is added to the water that is provided to the contamination control apparatus for removing the contaminants in the air. Therefore, the pH of the water is constantly maintained. As a result, the contamination control apparatus has improved efficiency for removing the contaminants from a flow of air supplied to the contamination control apparatus. Further, the contaminants captured in the water are continuously removed so that the water has enhanced efficiency for capturing contaminants in the air.

These and other exemplary embodiments, features, aspects, and advantages of the present invention will be described and become readily apparent from the following detailed description of exemplary embodiments when read in conjunction with the accompanying drawings.

DETAILED DESCRIPTION OF EXEMPLARY EMBODIMENTS

An additive for maintaining the pH of the water absorbs light to create an active species including an electron and a hole. The additive may include a photocatalyst. A photocatalyst reaction is an oxidation-reduction reaction of the electron/hole that is created by applying a sufficient amount of energy to a material activated by the photocatalyst to cause electrons to bridge a gap in the energy band. A high oxidation-reduction potential obtained from the catalyst purifies most environmental contaminants so that the photocatalyst is used for removing contaminants, for example $NO_x$, $SO_x$ and VOC, within a flow of air. In addition, the photocatalyst may also remove an unpleasant odor and act as an antifungal agent.

A catalyst functions as a material that changes a reaction rate or initiates a reaction without being used up in a chemical reaction. The photocatalyst is a kind of catalyst. Light energy is applied to the photocatalyst to perform the above functions. Examples of a photocatalyst include zinc oxide (ZnO), cadmium sulfide (CdS), tungsten trioxide ($WO_3$), titanium dioxide ($TiO_2$), etc. These can be used alone or in any mixture thereof. Among these, $TiO_2$ has the most activity.

Figure 1:
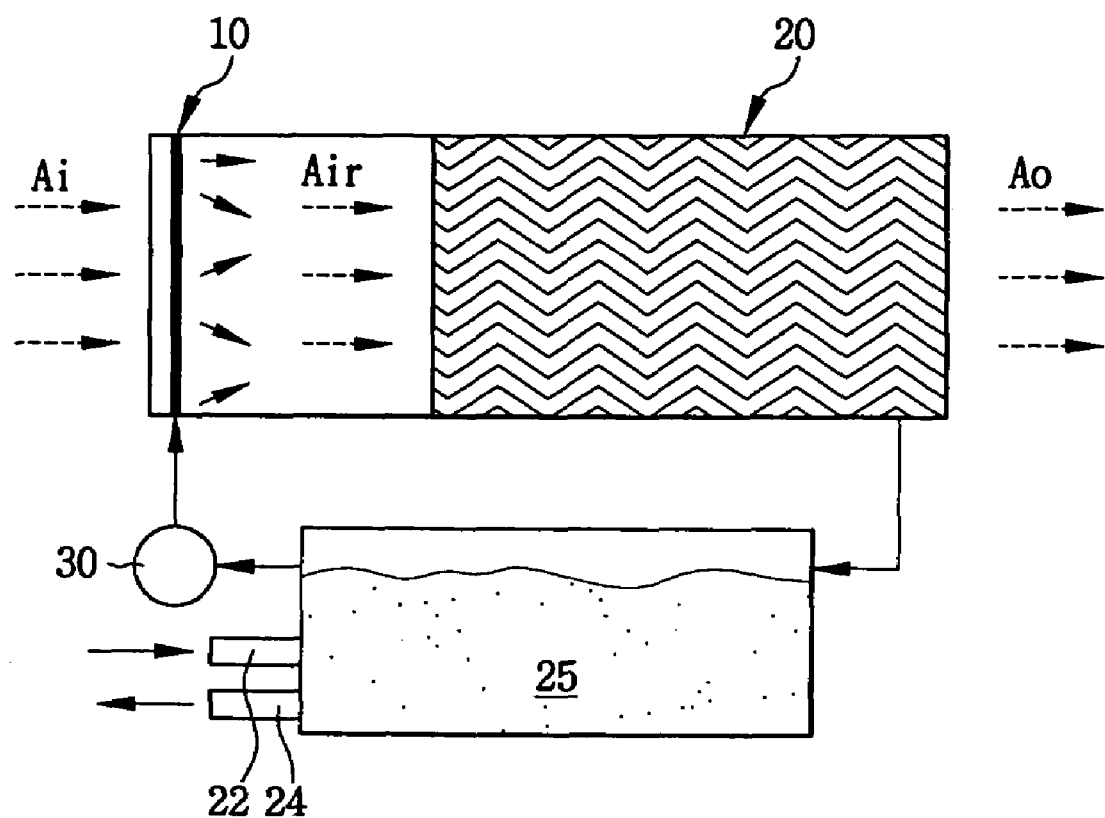
FIG. 1 is a schematic view illustrating a conventional contamination control system.
Figure 2:
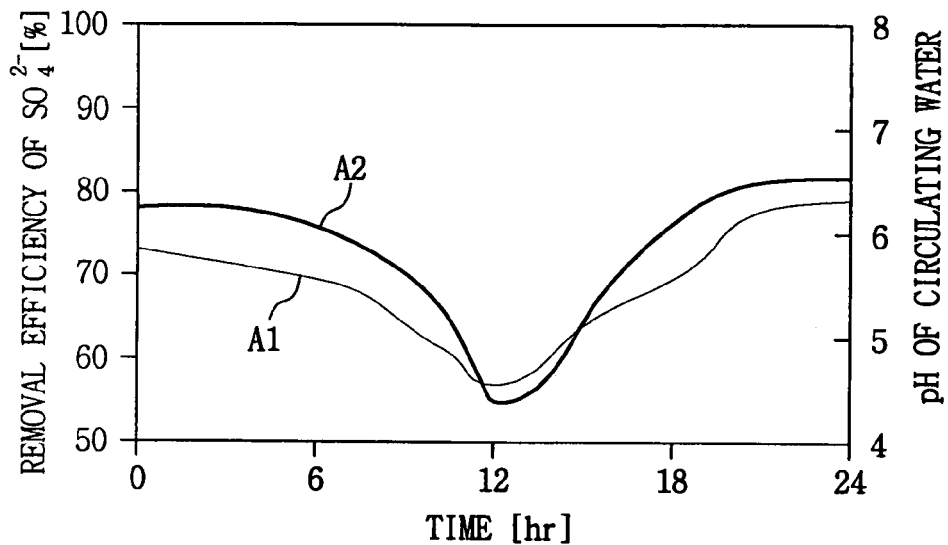
FIGS. 2 and 3 are graphs showing relation between pH of circulating water and removal efficiency of a conventional contamination control system.
Figure 3:
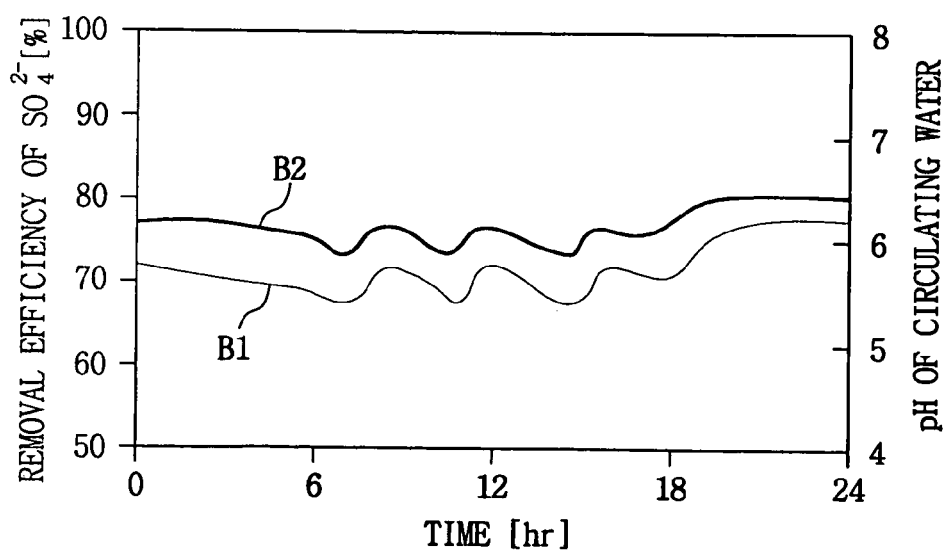
Figure 4:
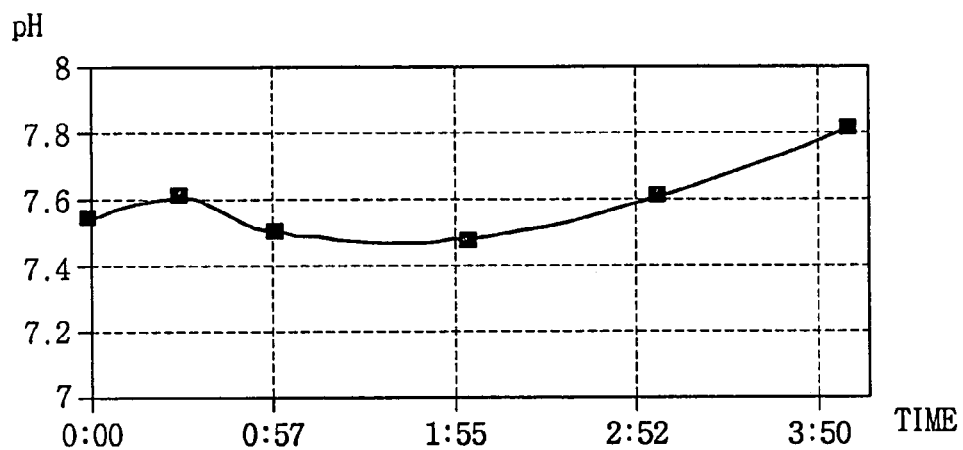
FIG. 4 is a graph showing pH of circulating water with respect to time.
Figure 5:
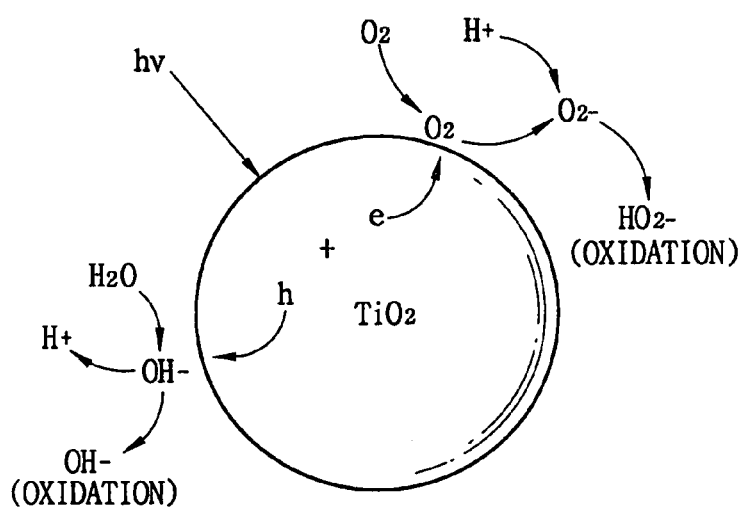
FIG. 5 is a schematic view illustrating a typical chemical reaction of a photocatalyst.

When an ultraviolet ray irradiates $TiO_2$, which has a semiconductor property in water, $TiO_2$ is excited to emit an electron. The electron reacts with dissolved oxygen or $H_2O_2$ to form a hydroxyl (OH) radical. A hydroxyl radical is also formed by the hole on a surface of $TiO_2$. The above reactions are represented by the following sequences with reference to FIG. 5.

① A reaction of $TiO_2$ by the ultraviolet radiation

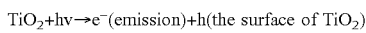

$TiO_2 + h\nu \rightarrow e^-(\text{emission}) + h(\text{the surface of } TiO_2)$ ② A reaction of the electron

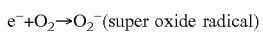

$e^- + O_2 \rightarrow O_2^- (\text{super oxide radical})$ $2O_2^- + 2H_2O \rightarrow 2OH + 2OH^- + O_2$ ③ An entire reaction of $TiO_2$

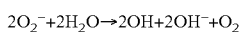

$h^+ + OH^- \rightarrow 2OH$

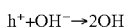

$TiO_2$ is not changed by the ultraviolet radiation such that $TiO_2$ is semi-permanently used. Further, the hydroxyl radical having a high oxidation power is created from $TiO_2$. The oxidation power of the hydroxyl radical is about 2.07 times greater than that of chlorine and is about 1.16 times greater than that of ozone. The hydroxyl radical having the high oxidation power dissolves a persistent organic material into $H_2O$ and $CO_2$. The hydroxyl radical oxidizes and precipitates a heavy metal ion. The hydroxyl radical also oxidizes and destroys a membrane of a bacteria or a mold to provide a deodorization effect.

As a result, according to the present invention, since the additive such as the photocatalyst is added to the circulating water of the water showering system, the quality of the circulating water is not changed so that the circulating water continues to effectively remove the contaminants in the air.

Hereinafter, the present invention will be explained in detail with reference to the accompanying drawings.

Figure 6:
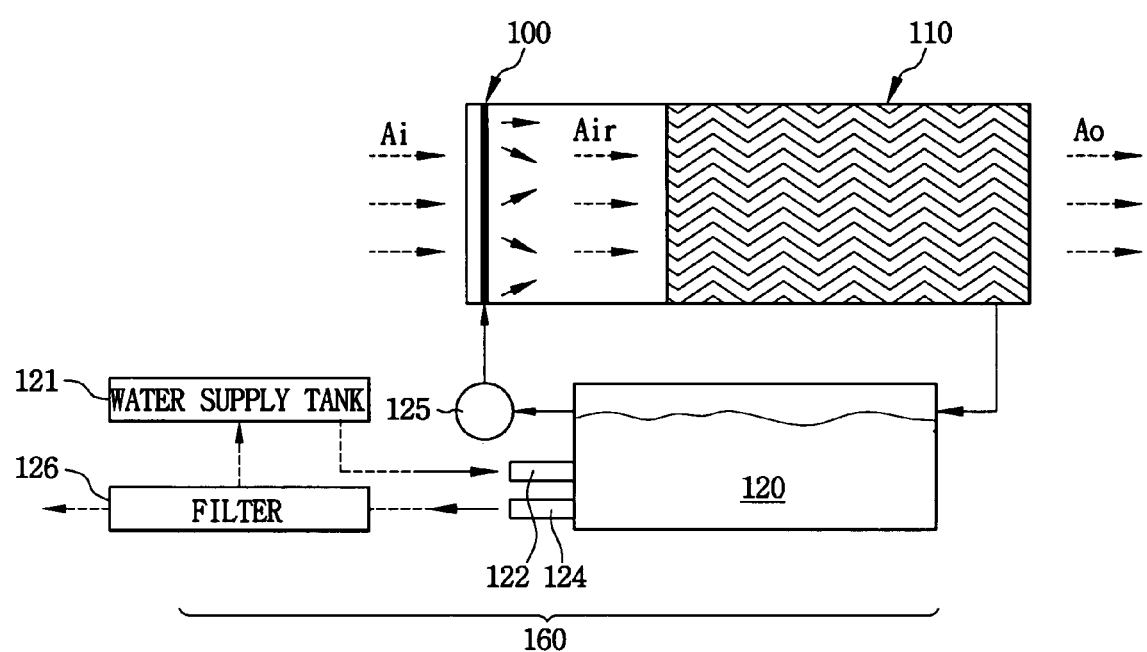
FIG. 6 is a schematic view illustrating a contamination control system in accordance with an exemplary embodiment of the present invention.

FIG. 6 is a schematic view illustrating a contamination control system in accordance with an exemplary embodiment of the present invention.

Referring to FIG. 6, the contamination control system comprises a spray unit 100 having at least one nozzle that sprays water in a form of droplets, an eliminator 110 for trapping water that captures contaminants from a flow of air supplied to the contamination control system and then dropping the water into a tank, and a water circulation unit 160 for continuously providing the water to the spray unit 100.

The water may include city water, industrial water or well water. Preferably, the water may include deionized water to control the quality of the water.

Pressure is applied to the nozzle to spray the water. In FIG. 6, the dotted lines represent the direction of air flow and solid lines represent the directions of water flow in the contamination control system. Air (Ai) that is introduced into the contamination control system passes through the eliminator 110 which removes removing the contaminants from the input air (Ai) to form clean air ($A_o$).

The water circulation unit 160 includes a water circulation tank 120 for storing the water that traps the contaminants by making contact with the air, and a water circulation pump 125 for providing the water in the tank 120 to the spray unit 100. The water circulation unit 160 further includes a water supply tank 121 for providing new water and a photocatalyst to the water circulation tank 120 through a water supply line 122, and a filter 126 for recovering the photocatalyst that is exhausted through a water drain line 124. The new water and the new catalyst are additionally provided to the water circulation tank 120 to replenish an amount of the water and the photocatalyst in the water circulation tank 120 that are lost during processing. The filter 126 filters the photocatalyst exhausted through the water drain line 124, thereby allowing the reuse of the photocatalyst.

Figure 7:
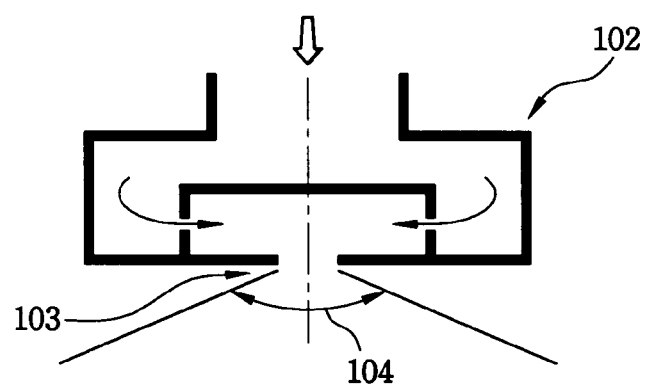
FIG. 7 is a cross-sectional view illustrating a nozzle of the contamination control system in FIG. 6.
Figure 8:
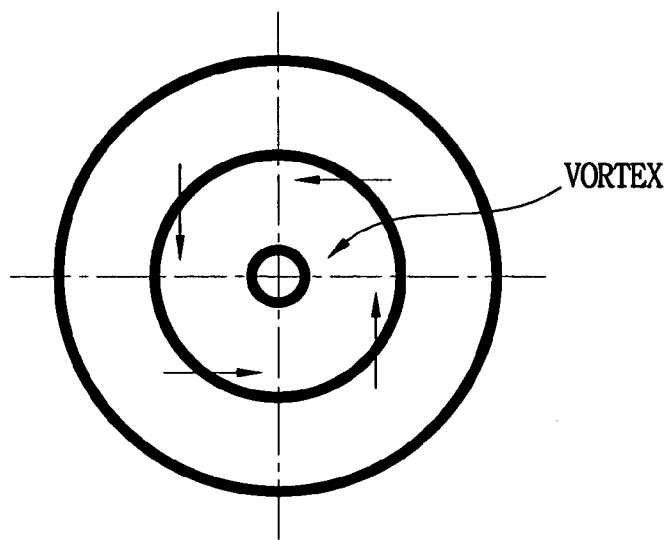
FIG. 8 is a front view illustrating a nozzle of the contamination control system in FIG. 6.

FIG. 7 is a cross-sectional view illustrating a nozzle of the contamination control system in FIG. 6 according to an exemplary embodiment of the invention. FIG. 8 is a front view illustrating a nozzle of the contamination control system in FIG. 6 according to an exemplary embodiment of the invention.

Referring to FIGS. 7 and 8, a method for spraying water may include a method for humidifying using ultrasonic waves and a method for pressurizing a nozzle. The nozzle may preferably include a hollow cone type nozzle 102. The hollow cone type nozzle 102 applies a rotary power to the water that is introduced into the nozzle 102 in a direction depicted by the arrows in FIGS. 7 and 8 to form a vortex in the water. In addition, the water does not directly pass through an orifice 103. Rather, the water passes through the orifice 103 in the form of a droplet and is sprayed into the contamination control system. A spray angle 104 of the water having the vortex is determined in accordance with a size of the orifice 103. The droplet rotates and spreads to form a water surface that comes into contact with the flow of air, thereby improving efficiency for capturing the contaminants.

Figure 9:
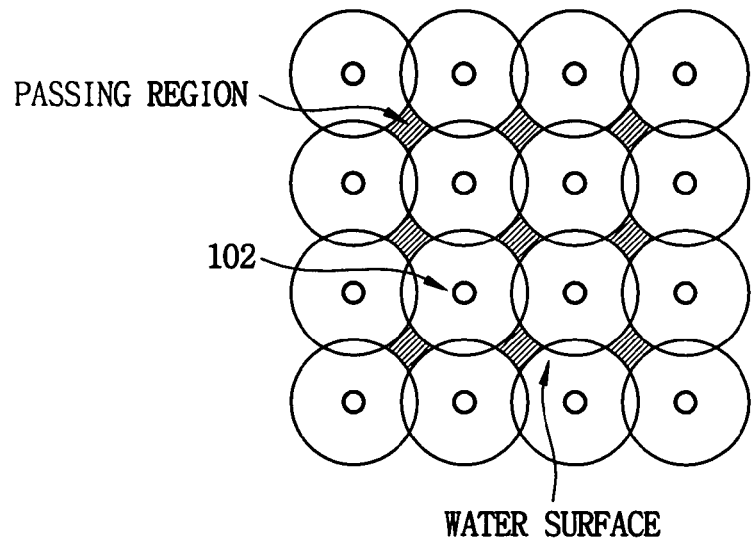
FIGS. 9 and 10 are schematic views illustrating an array of the nozzle in FIGS. 7 and 8.
Figure 10:
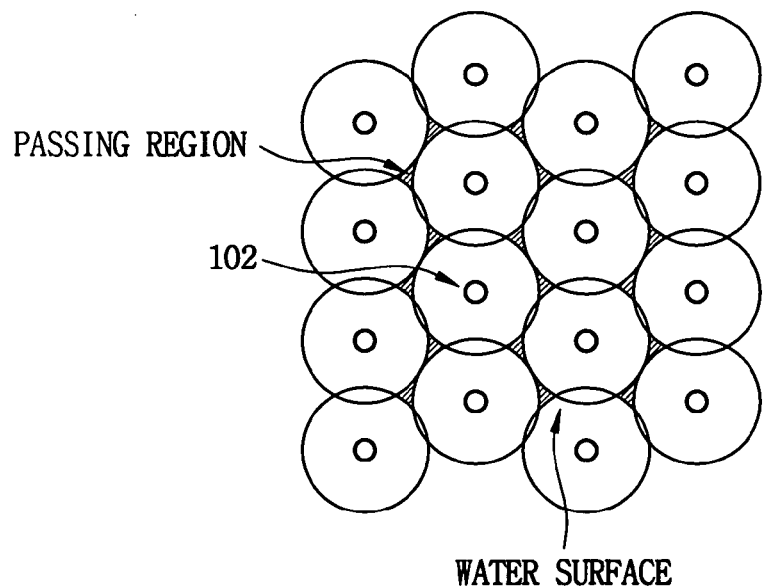
Figure 11:
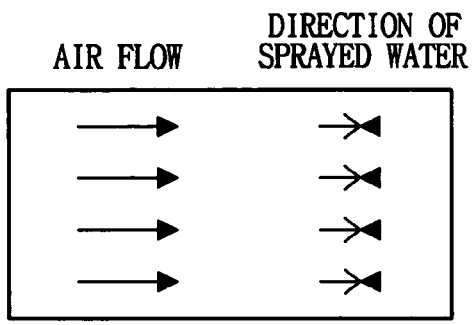
FIGS. 11 to 13 are schematic views illustrating directions of an air flow and a water flow in the contamination control system in FIG. 7.
Figure 12:
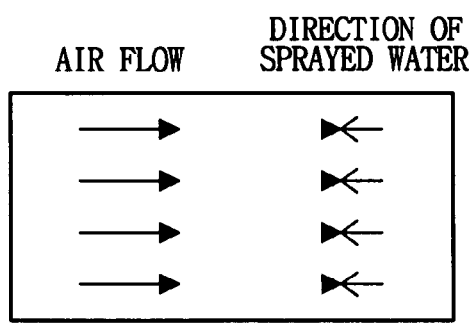
Figure 13:
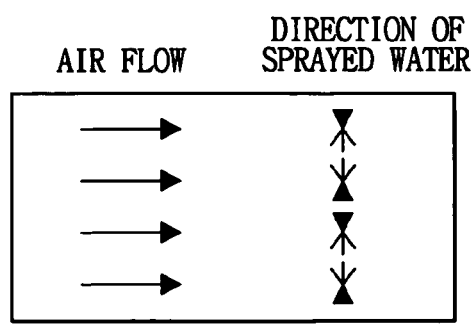
Figure 14:
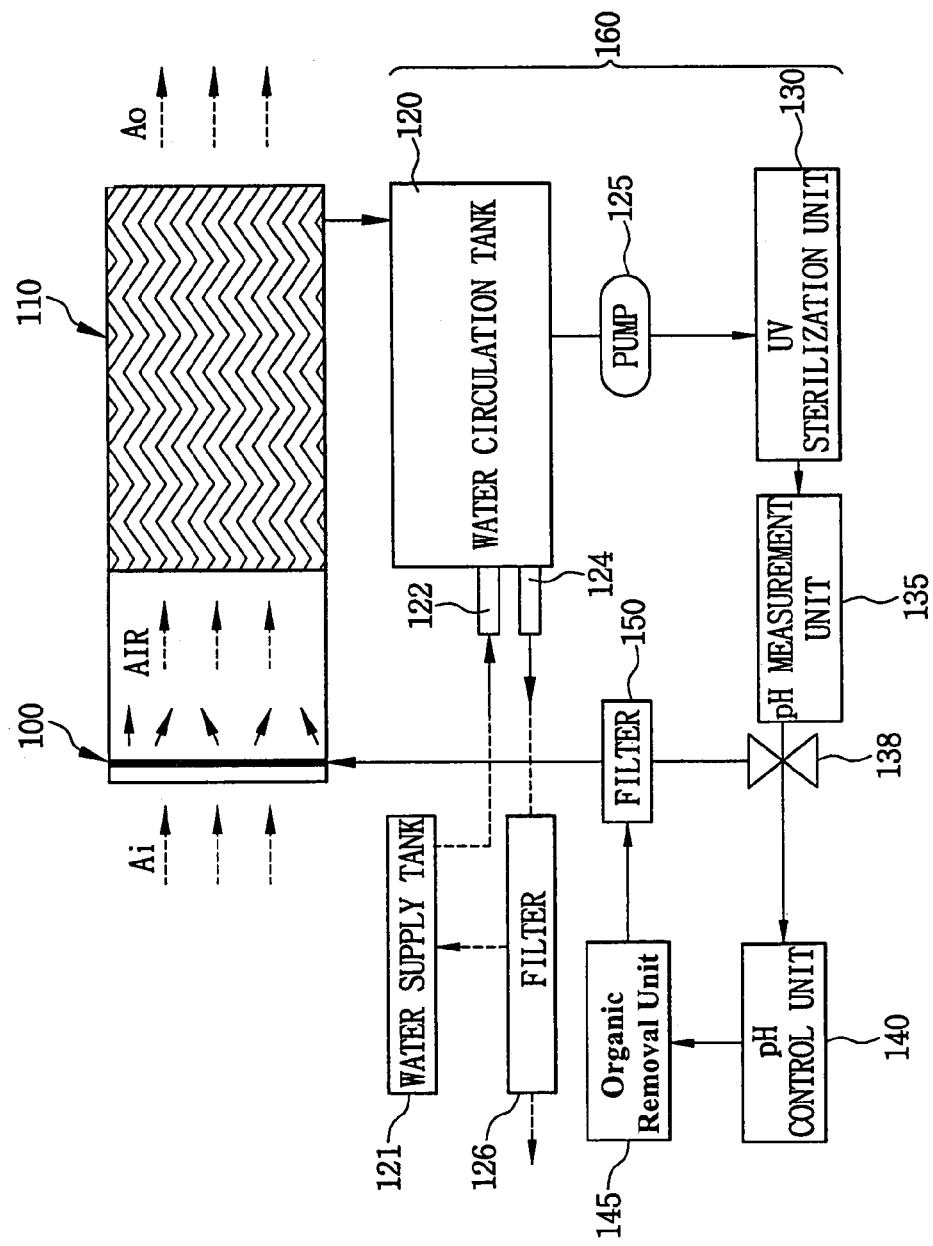
FIG. 14 is a schematic view illustrating a contamination control system in accordance with another exemplary embodiment of the present invention.

FIGS. 9 and 10 are schematic views illustrating an array of the nozzle in FIGS. 7 and 8, according to exemplary embodiments of the invention. The air passing through the water surface may be controlled by properly disposing the nozzle 102 using the characteristic that the droplet is sprayed from the nozzle 102 to form the water surface. Namely, a region of air passing through the water surface is minimized in accordance with the array of the nozzle 102 to optimize contact between the droplet and the contaminants. The spray pressure of the droplet determines a state of the water surface so that the water surface may vary in accordance with a running condition of the water showering system. When the running condition is substantially identical, the nozzle 102 arranged in a zigzag pattern as shown in FIG. 10 may remove a greater amount of contaminates from the flow of air than that of the nozzle 102 arranged in a line pattern as shown in FIG. 9. Thus, the nozzle 102 arranged in the zigzag pattern has a greater removal efficiency of the contaminants from the flow of air than that of the nozzle 102 arranged in the line pattern.

FIGS. 11 to 13 are schematic views illustrating directions of air flow and water flow in the contamination control system in FIG. 7. The directions of the water sprayed from the nozzle may be substantially identical to that of the air as shown in FIG. 11, may be substantially opposite to that of the air as shown in FIG. 12, and may be substantially perpendicular to that of the air as shown in FIG. 13. Preferably, the water is sprayed in a direction substantially opposite to that of the air, as shown in FIG. 12, to increase a resident time for the water and the air making contact. That is, since the contaminants may be captured in the water proportional to the contact time between the contaminants and the water, the resident time has a great influence on the efficiency of removing the contaminants from the flow of air.

A pH and quality of the water also determine the efficiency of removing the contaminants from the flow of air in a wet air-conditioning type contamination control system. According to the conventional contamination control system as shown in FIG. 1, as the circulating water is continuously used, the pH and quality of circulating water are reduced. Thus, the contamination level of the circulating water becomes substantially identical to that of the air such that the efficiency of removing the contaminants from the air is reduced. On the contrary, in accordance with the contamination control system in FIG. 6, the pH of the circulating water through the water circulation unit 160 is maintained using an additive such that the efficiency of removing the contaminants from the air is not reduced.

In a contamination control system according to an exemplary embodiment of the present invention, the air ($A_i$) passing through the contamination control system contacts the water. In particular, the water is continuously sprayed in the form of droplets from the nozzle of the spray unit 100. The droplets contact the air ($A_i$). A size of a droplet is determined according to a size of the nozzle and a hydraulic pressure of the sprayed water. Thus, a desired size of a droplet may be obtained by properly controlling the size of the nozzle and the hydraulic pressure. As the size of a droplet decreases, the water surface is broadened so that a ratio of capturing the contaminants increases. Preferably, the droplets have a size of below about 100 μm.

A droplet passing through the eliminator 110 captures the contaminants in the air ($A_i$). The droplet capturing the contaminants collides against plates of the eliminator 110 and then drops into a tank. The eliminator 110 may include plastic or stainless steel plates. Alternatively, the eliminator 110 may have a porous plate. The porous plates may be stacked and disposed to alternate holes formed through the plates. A droplet which captures contaminants that does not collide against a first plate is forced to collide against a second plate disposed behind the first plate for trapping the droplet.

A droplet dropped from the eliminator 110 is collected in the water circulation tank 120. The water in the water circulation tank 120 is provided to the spray unit 100 through the water circulation unit 160. The pump 125 controls the amount of the circulating water supplied to the spray unit 100.

The circulating water having the maintained pH and the improved quality is sprayed from the spray unit 100. The sprayed circulating water captures the contaminants in the air. The circulating water capturing the contaminants is collected in the water circulation tank 120 and is then circulated by the pump 125.

While the circulating water is collected in the water circulation tank 120, the circulating water in the water circulation tank 120 evaporates. Thus, the amount of the circulating water in the water circulation tank 120 is reduced. Water is provided to the water circulation tank 120 through the water supply line 122 to replenish an amount of the circulating water that has evaporated during processing. The circulating water in the water circulation tank 120 is also drained through the water drain line 124 to maintain the level of the circulating water in the water circulation tank 120.

According to the conventional contamination control system, when the circulating water is continuously used, the pH of the circulating water is reduced so that the efficiency of capturing the contaminants is reduced. Thus, new water having a volume of above about 90% relative to that of the circulating water in the water circulation tank is provided to the water circulation tank for diluting the contamination of the circulating water and to maintain the pH of the circulating water. As a result, when the amount of the new water provided to the water circulation tank is too much, a running cost of the contamination control system may be augmented. On the contrary, in a contamination control system according to an exemplary embodiment of the present invention, the additive maintains the pH of the circulating water. Accordingly, the new water having a volume of below about 10% relative to that of the circulating water in the water circulation tank 120 is provided to the water circulation tank 120 through the water supply line 122. Remaining circulating water in the water circulation tank 120 is continuously circulated to prevent adding an excess amount of the new water to the water circulation tank 120, thereby curtailing the running cost of the contamination control system.

FIG. 14 is a schematic view illustrating a contamination control system in accordance with another exemplary embodiment of the present invention. The contamination control system comprises elements substantially identical to those of the contamination control system in accordance with the exemplary embodiment of FIGS. 6-13 except for a pH control unit, an organic removal unit, an ultraviolet sterilization unit, etc.

A water circulating unit 160 of the exemplary contamination control system in FIG. 14 comprises a water supply tank 121 for providing new water and a new photocatalyst to a water circulation tank 120, a filter 126 for collecting a photocatalyst drained through a drain line 124, a pH measurement unit 135 for measuring a pH of a circulating water that is provided from the water circulation tank 120 to a spray unit 100, a pH control unit 140 for controlling the pH of the circulating water within a predetermined range, and an organic removal unit 145 for removing an organic substance in the circulating water.

The pH control unit 140 may preferably include an ion exchanger. The ion exchanger changes a deficient polar ion or an excessive polar ion into a neutral ion to maintain the pH of the circulating water within the predetermined range. The organic removal unit 145 may preferably include an organic resin.

The photocatalyst maintains the pH of the circulating water. Additionally, the pH control unit 140 also maintains the pH of the circulating water to prevent a reduction in the efficiency of capturing contaminants. Further, the organic removal unit 145 removes the organic substance in the circulating water so that quality of the circulating water is improved, thereby enhancing the efficiency of capturing the contaminants.

The water circulation unit 160 includes an ultraviolet sterilization unit 130 for sterilizing the circulating water, and a filter 150 for filtering the contaminants in the circulating water. The sterilization unit 130 may preferably include an ultraviolet irradiation unit.

Since the circulating water stays in the water circulation tank 120, a microorganism, for example various bacteria and aquatic plants, may propagate in the water circulation tank 120. An ultraviolet ray is irradiated from an ultraviolet irradiation unit to the water circulation tank 120 to sterilize the inside of the water circulation tank 120, thereby effectively suppressing the propagation of the microorganism.

Figure 15:
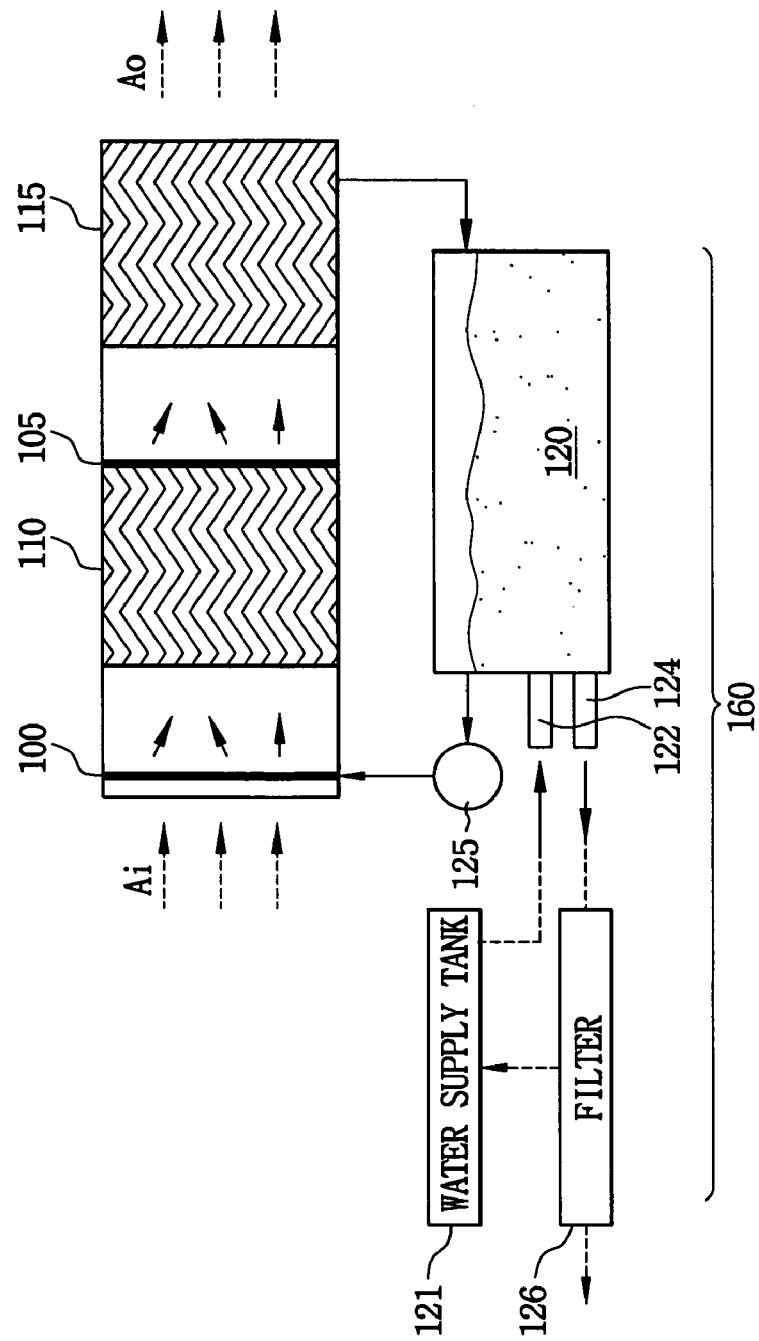
FIG. 15 is a schematic view illustrating a contamination control system in accordance with another exemplary embodiment of the present invention.

FIG. 15 is a schematic view illustrating a contamination control system in accordance with another exemplary embodiment of the present invention. The contamination control system of FIG. 15 has elements substantially identical to the contamination control systems in accordance with the exemplary embodiments of FIGS. 6-13, except for an eliminator. Accordingly, same or similar elements are indicated by same numerals. Further, illustrations of the elements are omitted.

More specifically, referring to FIG. 15, at least two eliminators 110 and 115 are disposed in series to sufficiently contact circulating water with a flow of air in the eliminators 110 and 115, thereby improving the efficiency of capturing contaminants in the air.

Accordingly, the contamination control system includes a first spray unit 100, a first eliminator 110, a second spray unit 105, a second eliminator 115 and a water circulation unit 160. The circulating water is simultaneously supplied to the first and second spray units 100 and 105, respectively. Air ($A_i$) introduced into the contamination control system subsequently passes through the first and second eliminators 110 and 115. The air ($A_i$) contacts the circulating water to remove the contaminants from the air ($A_i$) to form clean air ($A_o$). The clean air ($A_o$) without the contaminants is then discharged from the eliminators 110 and 115.

Figure 16:
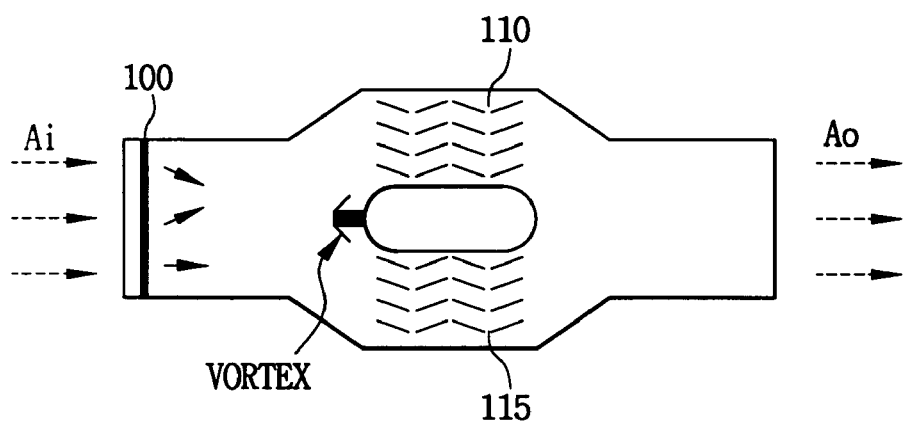
FIG. 16 is a schematic view illustrating a contamination control system in accordance with another exemplary embodiment of the present invention.

FIG. 16 is a schematic view illustrating a contamination control system in accordance with another exemplary embodiment of the present invention. Referring to FIG. 16, at least two eliminators 110 and 115 are disposed in a row in a stacked arrangement to form a vortex in air ($A_i$) introduced into a contamination control system between the eliminators 110 and 115, thereby increasing the residence time where the water and air ($A_i$) are in contact. Accordingly, the efficiency of removing the contaminants from the air ($A_i$) is improved.

Figure 17:
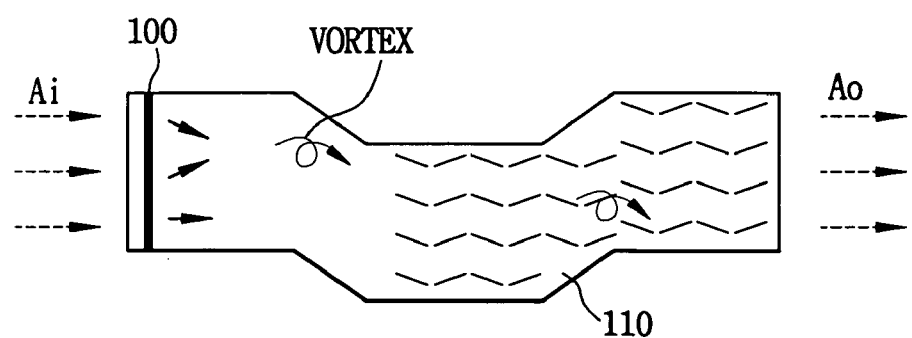
FIG. 17 is a schematic view illustrating a contamination control system in accordance with another exemplary embodiment of the present invention.

FIG. 17 is a schematic view illustrating a contamination control system in accordance with another exemplary embodiment of the present invention. The exemplary contamination control system shown in FIG. 17 comprises an eliminator 110 having a bent shape to form a vortex in air ($A_i$) introduced into a contamination control system through the eliminator 110. Accordingly, a time of contact between circulating water and the air ($A_i$) is lengthened so that efficiency of removing contaminants is enhanced.

Figure 18:
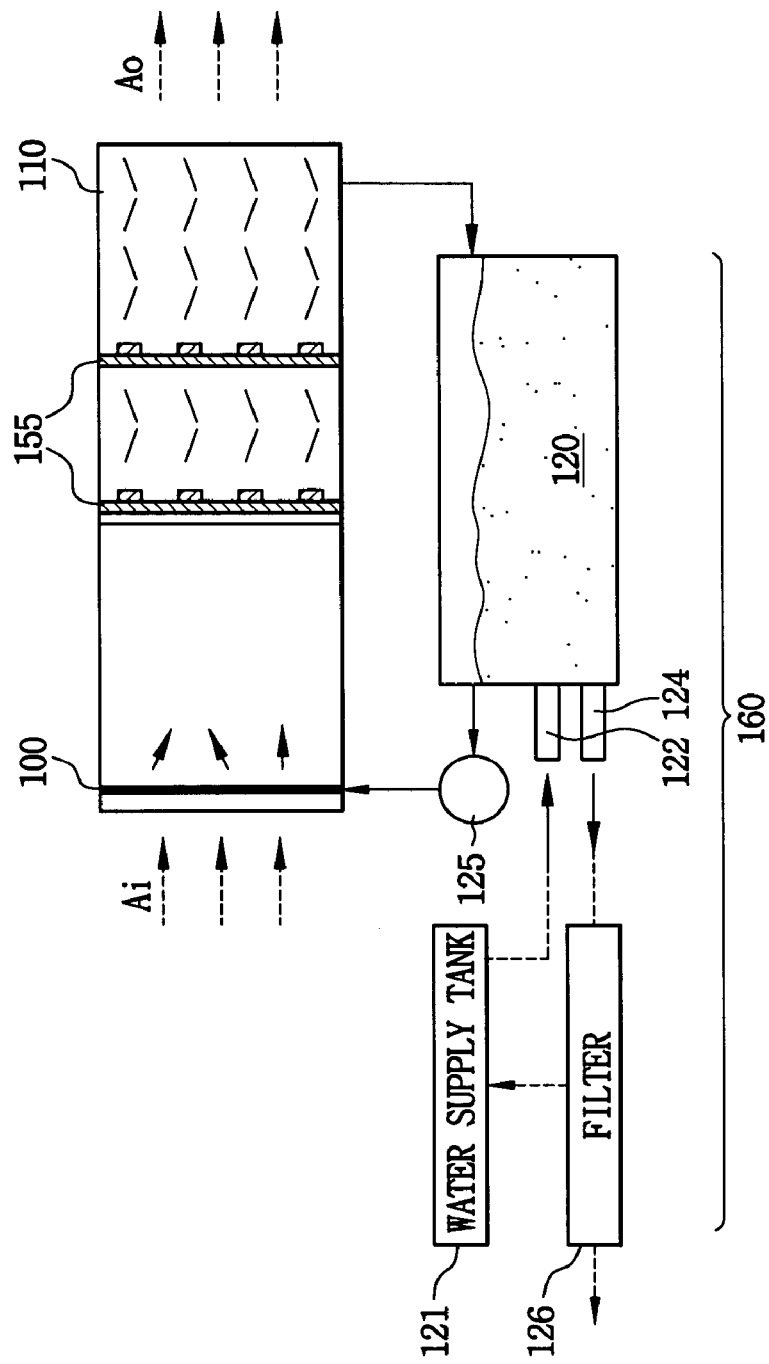
FIG. 18 is a schematic view illustrating a contamination control system in accordance with another exemplary embodiment of the present invention.

FIG. 18 is a schematic view illustrating a contamination control system in accordance with another exemplary embodiment of the present invention. The contamination control system has elements substantially identical to those of the contamination control system in accordance with the exemplary contamination control systems of FIGS. 6-13 except for a nozzle 155. Accordingly, illustrations of the elements are omitted.

A nozzle 155 is disposed in an eliminator 110. The nozzle 155 additionally sprays water, preferably deionized water, into the eliminator 110 to improve efficiency of removing contaminants from a flow of air being supplied to the eliminator 110. A resident time for making contact between the water and air ($A_i$) is maximized so that efficiency of removing contaminants is improved.

Alternatively, the deionized water used as circulating water in the above-described embodiments may include hexagonal-looped water. Generally, nano-clustered water has a structure that includes five to seven water molecules. The nano-clustered water is referred as micro-combined water, structured water, crystalline water, hexagonal-looped water or micro-clustered water. A method for changing water into hexagonal-looped water may include electrolysis, a method for refrigerating water, a method for introducing germanium ions or a method for fabricating magnetized hexagonal-looped water using an electromagnet. The cluster of the hexagonal-looped water has a size of below about ⅓ than that of the cluster of typical water. Accordingly, since the contact area between hexagonal-looped water and air increases, solubility relative to soluble contaminants in the air is augmented so that efficiency of removing the contaminants is improved. The contamination control system using the hexagonal-looped water as circulating water has improved efficiency for removing the contaminants from a flow of air.

Figure 19:
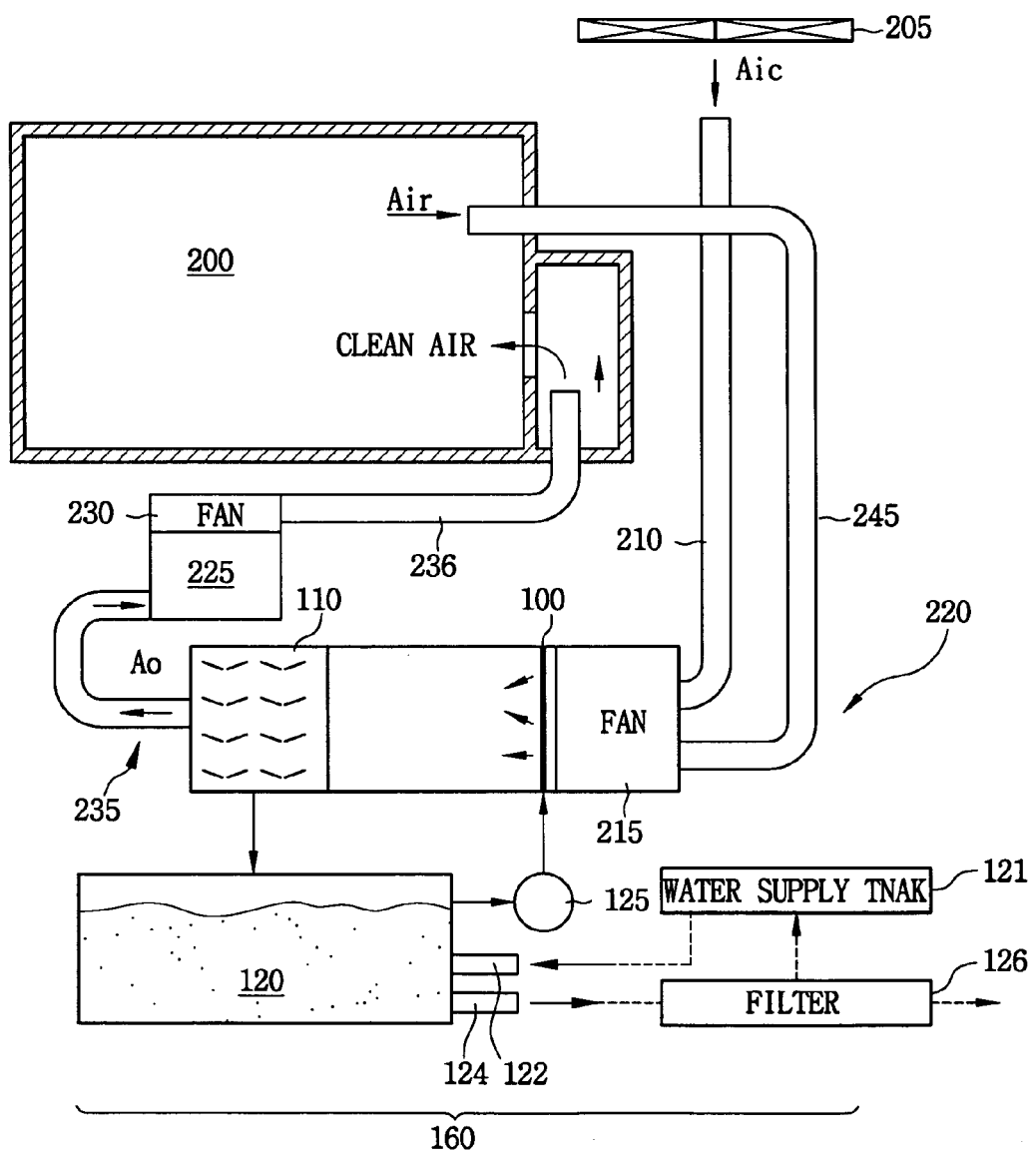
FIG. 19 is a schematic view illustrating an air-conditioning system of a substrate processing apparatus in accordance with another exemplary embodiment of the present invention.

FIG. 19 is a schematic view illustrating an air-conditioning system of a substrate processing apparatus in accordance with another exemplary embodiment of the present invention. The exemplary air-conditioning system of FIG. 19 may be employed in an apparatus for exposing a resist that includes a scanner and a stepper. The air-conditioning system comprises a contamination control apparatus 220 for providing clean air ($A_o$) from which contaminants, for example $O_3$, $NH_3$, $SO_x$, $NO_x$, an organic substance, etc., are removed to a substrate processing chamber 200 of the exposure apparatus.

The contamination control apparatus 220 includes a spray unit 100 having at least one nozzle that sprays water in the form of droplets, an eliminator 110 for trapping the water that captures contaminants from a flow of air and then dropping the water into a tank 120, and a water circulation unit 160 for continuously providing the water to the spray unit 100.

The water circulation unit 160 includes the water circulation tank 120 for storing the water that traps the contaminants by making contact with the air, and a water circulation pump 125 for providing the water in the tank 120 to the spray unit 100. The water circulation unit 160 further includes a water supply tank 121 for providing new water and a photocatalyst to the water circulation tank 120 through a water supply line 122, and a filter 126 for recovering the photocatalyst that is exhausted through a water drain line 124.

New water having a volume of below about 10% relative to that of the circulating water in the water circulation tank 120 is provided to the water circulation tank 120 through the water supply line 122. The remaining circulating water in the water circulation tank 120 is continuously circulated so that the need to excessively provide new water to the water circulation tank 120 is prevented, thereby reducing a running cost of the contamination control apparatus 220.

Alternatively, the contamination control apparatus 220 may include an eliminator 110 substantially identical to that of the contamination control systems in accordance with the exemplary embodiments of FIGS. 15-18. The contamination control apparatus 220 may also include the hexagonal-looped water used in the exemplary contamination control system in accordance with the exemplary embodiment of FIG. 19.

Outdoor air passes through a filter 205 in a clean room for partially removing contaminants to form clean room air ($A_{ic}$). The clean room air ($A_{ic}$) is introduced into the contamination control apparatus 220 through an air supply line 210 by a fan 215. The clean room air ($A_{ic}$) passes through the contamination control apparatus 220. The clean room air ($A_{ic}$) contacts the circulating water for entirely removing the contaminants from the outside air to form clean air ($A_o$). The clean air ($A_o$) is introduced into a control unit 225 for controlling temperature and humidity of the clean air ($A_o$) that passes through a first clean air line 235. The control unit 225 includes a temperature control unit and a dryer. The control unit 225 controls the temperature and the humidity of the clean air ($A_o$). The clean air ($A_o$) is introduced into the substrate processing chamber 200 through a second clean air line 236 via a fan 230. The clean air ($A_o$) downwardly flows in the substrate processing chamber 200 through a filter (not shown) having a high capacity, for example the FFU. The FFU may be disposed on a ceiling of the substrate processing chamber 200.

Air ($A_{ir}$) in the substrate processing chamber 200 may or may not have a very small quantity of an alkali component such as ammonia so that the air ($A_{ir}$) may be reused. Thus, the air-conditioning system further includes a circulation line 245 for introducing the air ($A_{ir}$) into the contamination control apparatus 220.

The air ($A_{ir}$) is introduced into the contamination control apparatus 220 by the fan 215. The air ($A_{ir}$) is mixed with the air ($A_{ic}$) in the contamination control apparatus 220. The mixed air contacts the circulating water to remove the contaminants in the mixed air. The mixed air is then provided to the substrate processing chamber 200 through the first and second clean air lines 235 and 236, respectively. Preferably, the mixed air introduced into the contamination control apparatus 220 includes about 80% by volume of the air ($A_{ir}$) and about 20% by volume of the air ($A_{ic}$).

According to the air-conditioning system of the present invention, the air ($A_{ir}$) and the air ($A_{ic}$) pass through the contamination control apparatus 220 for removing the contaminants to create the clean air ($A_o$). The clean air ($A_o$) is provided to the substrate processing chamber 200 so that a desired clean level is obtained. Further, a process failure due to the contaminants is prevented so that a yield and reliability of a semiconductor device are improved. Also, a process for manufacturing a semiconductor device is maintained and stable. Additionally, since the contamination control apparatus 220 uses a photocatalyst having a semi-permanent life in substitute for the expensive chemical filter that may be periodically exchanged every two years is employed in the air-conditioning system, the running cost of the air-conditioning system may be curtailed.

Figure 20:
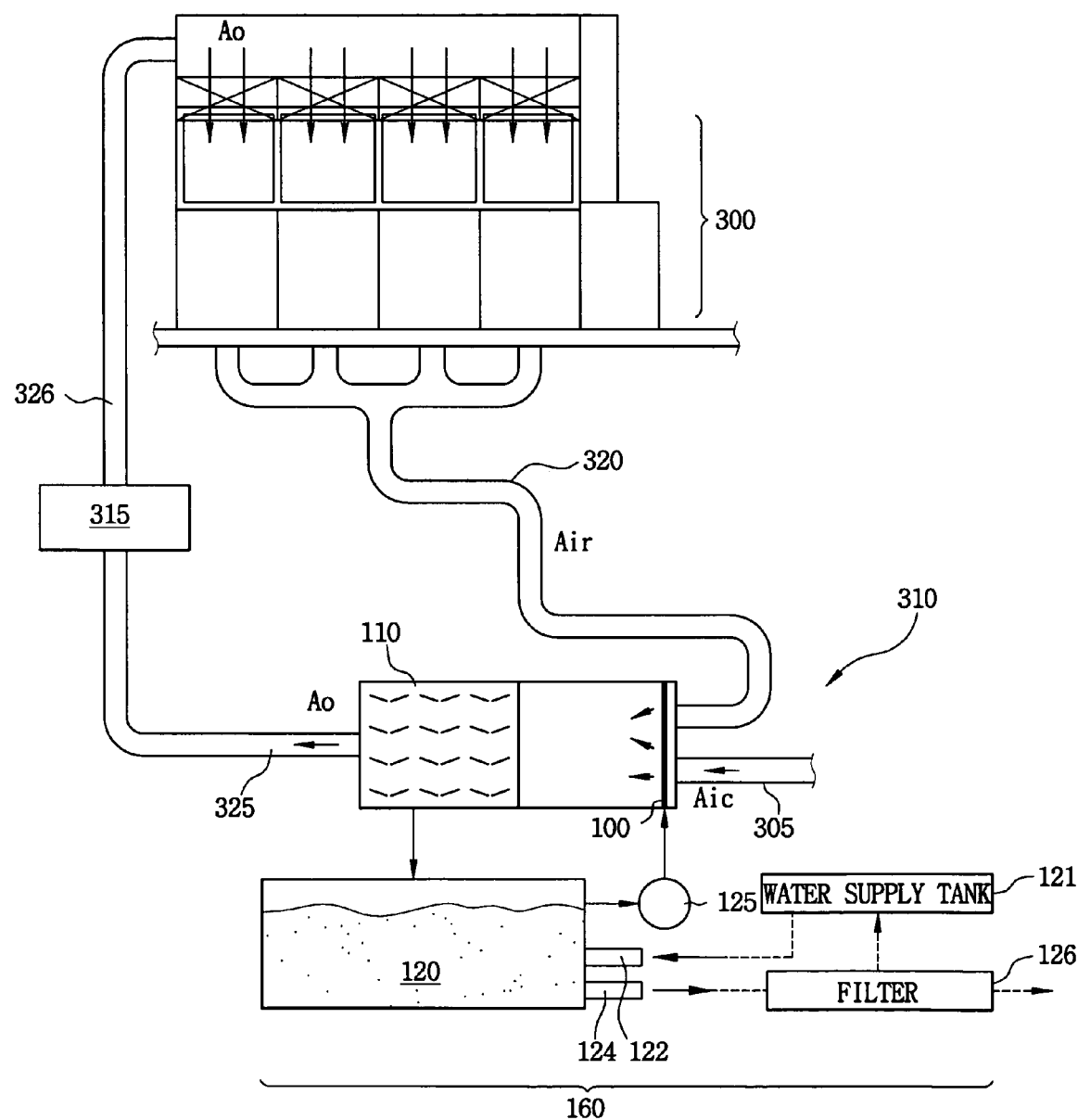
FIG. 20 is a schematic view illustrating an air-conditioning system of a substrate processing apparatus in accordance with another exemplary embodiment of the present invention.

FIG. 20 is a schematic view illustrating an air-conditioning system of a substrate processing apparatus according to another exemplary embodiment of the present invention. The air-conditioning system may be employed in a resist spinner including a coater and a developer. The air-conditioning system comprises a contamination control apparatus 310 for providing clean air ($A_o$), from which contaminants, for example, $O_3$, $NH_3$, $SO_x$, $NO_x$, an organic substance, etc., are removed, to a substrate processing chamber 300 of the resist spinner.

The contamination control apparatus 310 includes a spray unit 100 having at least one nozzle that sprays water in the form of droplets, an eliminator 110 for trapping the water that captures contaminants in a flow of air and then dropping the water into a tank, and a water circulation unit 160 for continuously providing the water to the spray unit 100.

The water circulation unit 160 includes a water circulation tank 120 for storing the water that traps the contaminants by making contact with the air, and a water circulation pump 125 for providing the water in the tank 120 to the spray unit 100. The water circulation unit 160 further includes a water supply tank 121 for providing new water and a photocatalyst to the water circulation tank 120 through a water supply line 122, and a filter 126 for recovering the photocatalyst that is exhausted through a water drain line 124.

Air ($A_{ic}$) is introduced into the contamination control apparatus 310 through an air supply line 305. The air ($A_{ic}$) passes through the contamination control apparatus 310. The air ($A_{ic}$) contacts the circulating water. The circulating water removes the contaminants from the air ($A_{ic}$) to create clean air ($A_o$). The clean air ($A_o$) is introduced into a control unit 315 for controlling temperature and humidity of the air ($A_o$) that passes through a first clean air line 325. The control unit 315 includes a temperature control unit and a dryer. The control unit 315 controls the temperature and the humidity of the clean air ($A_o$). The clean air ($A_o$) is then introduced into the substrate processing chamber 300 through a second clean air line 326. The clean air ($A_o$) downwardly flows into the substrate processing chamber 300 through a filter (not shown) having a high capacity, for example the FFU. The FFU may be disposed on a ceiling of the substrate processing chamber 300.

The air-conditioning system further includes a circulation line 320 for introducing the air ($A_{ir}$) into the contamination control apparatus 310. The air ($A_{ir}$) is introduced into the contamination control apparatus 310. The air ($A_{ir}$) is mixed with the air ($A_{ic}$) in the contamination control apparatus 310. The mixed air contacts the circulating water to remove the contaminants from the mixed air. The air is then provided to the substrate processing chamber 300 through the first and second clean air lines 325 and 326, respectively.

Since to much of an organic contaminant is generated due to resist in the spinner, the air introduced into the contamination control apparatus 310 may preferably include about 40% or less by volume of the air ($A_{ir}$) to minimize the amount of contaminants introduced into the contamination control apparatus 310.

Figure 21:
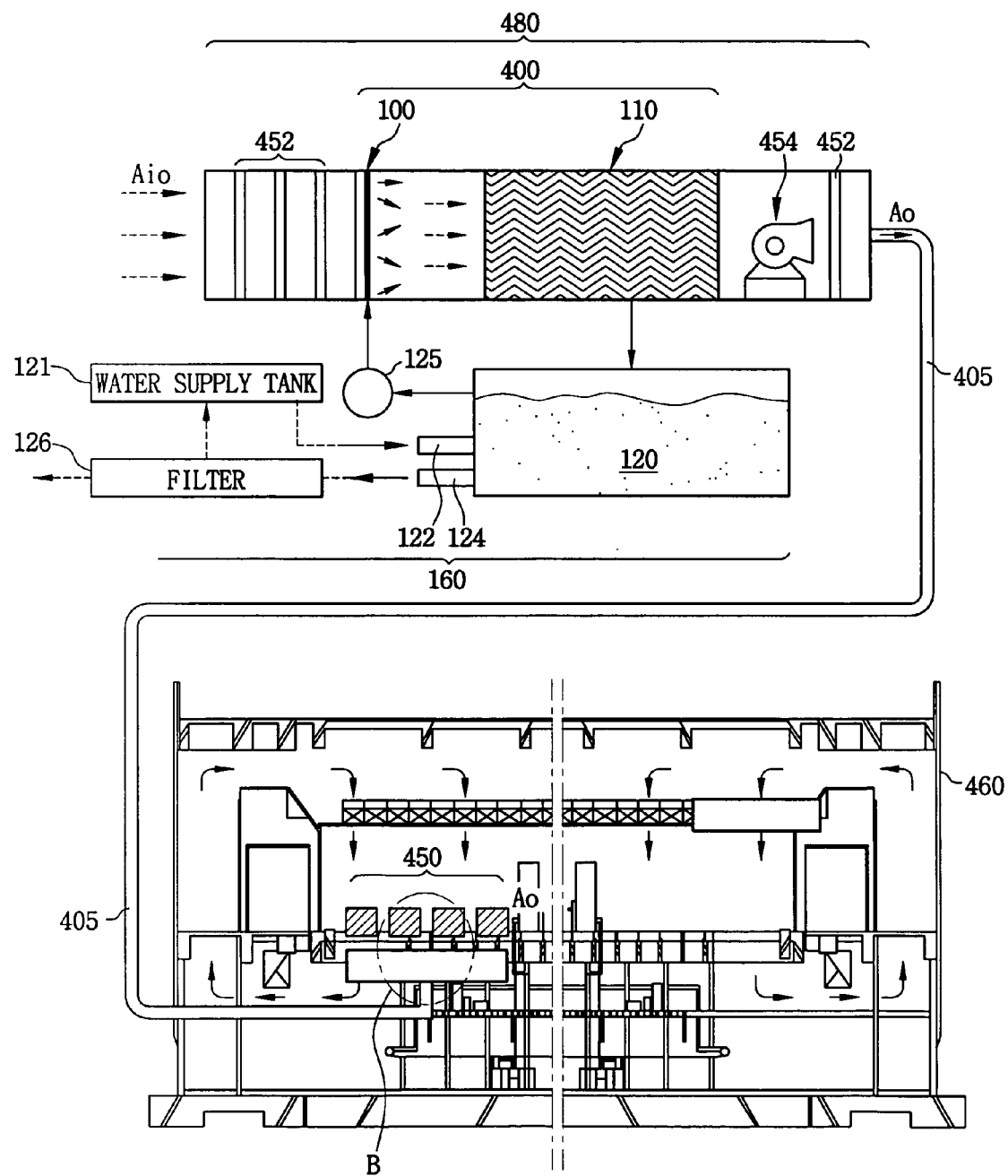
FIG. 21 is a schematic view illustrating an air-conditioning system of a substrate processing apparatus in accordance with another exemplary embodiment of the present invention.

FIG. 21 is a schematic view illustrating an air-conditioning system of a substrate processing apparatus in accordance with another exemplary embodiment of the present invention. Referring to FIG. 21, outdoor air ($A_{io}$) passing through an outdoor air-conditioning system is directly provided to a piece of equipment in which substrate processing apparatuses are disposed. The outdoor air-conditioning system includes filters 452, a contamination control apparatus 400 and a fan 454.

The contamination control apparatus 400 has elements substantially identical to those of the contamination control systems in accordance with the exemplary contamination control systems of FIGS. 6-18. The contamination control apparatus 400 includes a water circulation unit 160 having a pump 125. Accordingly, illustrations of the elements are omitted. Water, preferably deionized water, is continuously provided to a spray unit 100 by the pump 125. The water contacts the outdoor air to remove contaminants in the outdoor air ($A_{io}$).

The water circulation unit 160 includes a water circulation tank 120 for storing the water that traps the contaminants by making contact with the air, a water supply tank 121 for providing new water and a photocatalyst to the water circulation tank 120 through a water supply line 122, and a filter 126 for recovering the photocatalyst that is exhausted through a water drain line 124.

Since the pH of the circulating water is controlled and an organic substance in the circulating water is removed, efficiency for removing the contaminants from the air is improved. Accordingly, the pH of the circulating water is constantly maintained so that new water having a volume of below about 10% relative to that of the circulating water in the water circulation tank 120 is preferably provided to the water circulation tank 120 through the water supply line 122.

Alternatively, the contamination control apparatus 400 of an outdoor air-conditioning system 480 may include an eliminator 110 substantially identical to that of the exemplary contamination control systems of FIGS. 15-18. The contamination control apparatus 400 may also include hexagonal-looped water used in the exemplary contamination control system of FIG. 19.

The contamination control apparatus 400 is disposed outside of a clean room 460. Clean air ($A_o$) discharged from the outdoor air-conditioning system 480 is directly provided to the equipment through a duct 405 that is connected to the equipment. The equipment may include resist processing apparatuses.

In particular, the outdoor air ($A_{io}$) introduced into the outdoor air-conditioning system 480 passes through the filter 452 to remove dust. The outdoor air ($A_{io}$) then passes through the contamination control apparatus 400 for removing the contaminants from the outside air ($A_{io}$), for example $O_3$, $NH_3$, $SO_x$, $NO_x$ and organic substances to generate clean outdoor air ($A_o$). The clean outdoor air ($A_o$) is discharged through the duct 405 by the fan 454.

Figure 22:
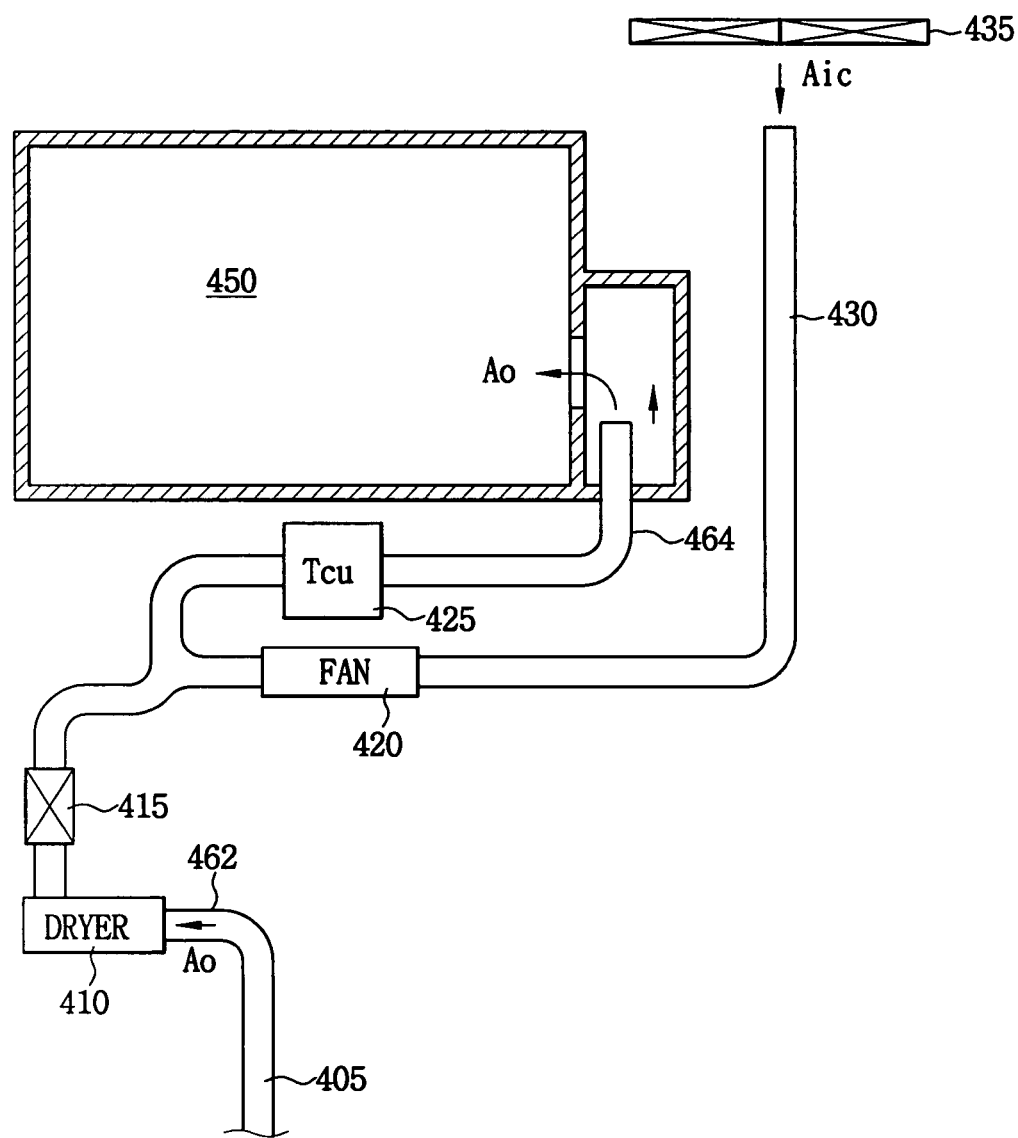
FIG. 22 is an enlarged view of a portion "B" in FIG. 21.

FIG. 22 is an enlarged view of a portion "B" in FIG. 21. With reference to FIG. 22, the clean outdoor air ($A_o$) is introduced into first air lines connected to each substrate processing chamber 450 through the duct 405. The clean outdoor air ($A_o$) subsequently passes through a dryer 410, a filter 415 such as a high efficiency particulate air (HEPA) filter or an ultra low pneumatic air (ULPA) filter, and a temperature control unit 425 to control temperature and humidity of the clean air ($A_o$). The clean outdoor air ($A_o$) is introduced into the substrate processing chambers 450 through a second air line 464.

Simultaneously, the outdoor air ($A_{io}$) passes through the clean room filter 435 to generate clean room air ($A_{ic}$). The clean room air ($A_{ic}$) circulates in the clean room 460. The clean room air ($A_{ic}$) is introduced into the substrate processing chambers 450 through an air supply line 430 by a fan 420. Here, the air supply line 430 may be connected to the duct 405 so that the temperature and/or the humidity of the clean room air ($A_{ic}$) may be controlled.

Generally, the outdoor air passes through the clean room filter 435 for removing $NH_3$, $SO_x$, and NOx to generate the clean room air ($A_{ic}$). However, the clean room air ($A_{ic}$) may have a very small amount of $O_3$ and an organic substance. Thus, the air introduced into the contamination control apparatus 450 may include about 80% to about 90% by volume of the clean air ($A_o$) and about 10% to about 20% by volume of the clean room air ($A_{ic}$).

According to the exemplary outdoor air-conditioning system of FIG. 21, the clean air passing through the contamination control apparatus is directly provided to the equipment so that a running cost of the air-conditioning system is reduced, as compared to the exemplary air-conditioning systems of FIGS. 19 and 20.

Figure 23:
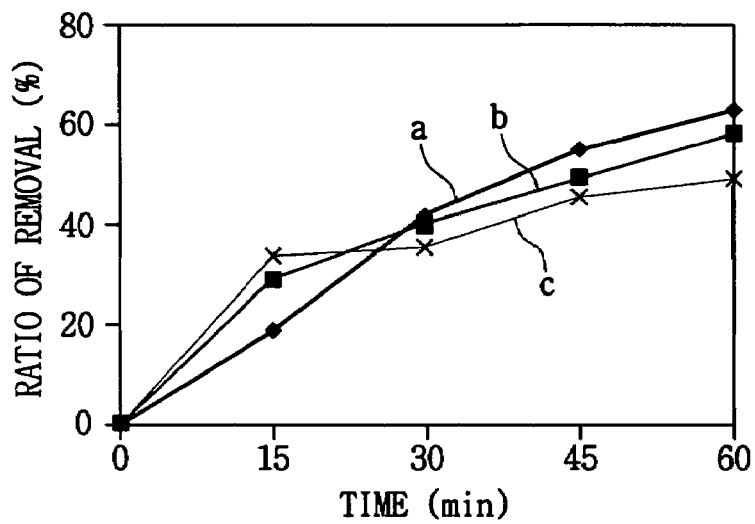
FIGS. 23 and 24 are graphs showing removal efficiency of the contamination control system in FIG. 6.
Figure 24:
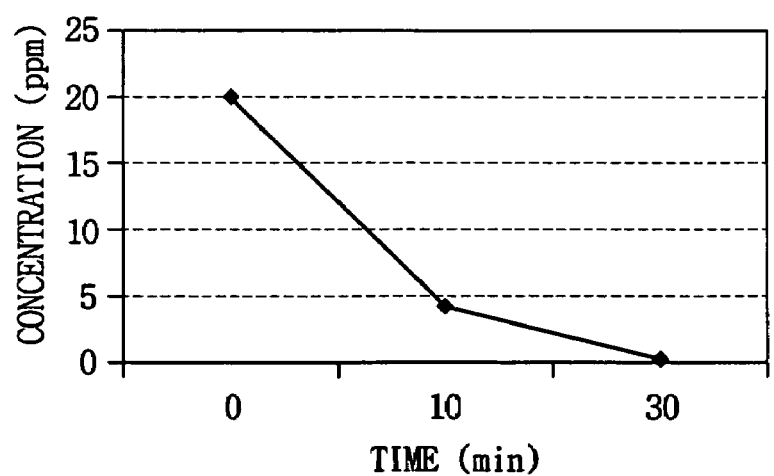

FIGS. 23 and 24 are graphs showing efficiency for removing contaminants by the contamination control system in FIG. 6. In FIG. 23, line a represents a removal ratio of benzene, line b represents a removal ratio of toluene and xylene, and line c represents a removal ration of ethylbenzene. It should be noted that the removal ratios of the contaminants increased proportionally with respect to time. It should be noted that the contaminant removal efficiency of the circulating water was constantly maintained regardless of a lapse of time.

FIG. 24 is a graph showing variation of concentration of $NO_x$ with respect to time. As shown in FIG. 24, it should be noted that $NO_x$ was entirely removed in thirty minutes. It should be noted that the photocatalyst had a high contaminant removal capacity.

According to exemplary embodiments of the present invention such as described above, the contamination of circulating water may be prevented using the additive in accordance with a lapse of time. Additionally, the contamination control system removes the various contaminants so that the contaminants may not be introduced into the substrate processing chamber. As a result, clean air is provided to the substrate processing chamber so that failures of a semiconductor device due to the contaminants may be prevented.

Further, wet air-conditioning type contamination control system is employed in the air-conditioning system of the substrate processing apparatus. Accordingly, the clean air without the contaminants may be provided to the substrate processing apparatus. Therefore, the yield and reliability of a semiconductor device are improved.

Particularly, since the expensive chemical filter that is periodically exchanged is not used, a process for fabricating the semiconductor device is stabilized and a running cost of the substrate processing chamber is reduced.

Having described exemplary embodiments of the present invention, it is noted that modifications and variations can be made by persons skilled in the art in light of the above teachings. It is therefore to be understood that changes may be made to the exemplary embodiments of the present invention disclosed which is within the scope and the spirit of the invention outlined by the appended claims.

What is claimed is:

1. A contamination control system comprising:
   a spray unit having a plurality of nozzles for spraying circulating water;
   at least one eliminator for trapping the circulating water that captures contaminants in a flow of air and for dropping the circulating water including the contaminants into a tank; and a water circulation unit for providing the circulating water that includes an additive for controlling a pH of the circulating water to the spray unit, wherein the additive comprises a photocatalyst, and wherein at least one of the plurality of nozzles is disposed in the at least one eliminator; a filter for recovering the photocatalyst in the circulating water that is discharged from the water circulation tank, a pH control unit including an ion exchanger for controlling the pH of the circulating water; and a organic removal unit including an organic resin for removing an organic substance in the circulating water.

2. The contamination control system of claim 1, wherein the plurality of nozzles are disposed in a zigzag pattern and wherein the photocatalyst absorbs a light to create an active species including an electron and a hole, the active species dissolving the contaminants.

3. A contamination control system comprising:
   a spray unit having at least one nozzle for spraying circulating water;
   at least one eliminator for trapping the circulating water that captures contaminants in a flow of air and for dropping the circulating water including the contaminants into a tank;
   a water circulation unit for providing the circulating water that includes an additive for controlling a pH of the circulating water to the spray unit, wherein the additive comprises a photocatalyst, and wherein the at least one eliminator comprises an eliminator having a bent shape adapted to form a vortex in the flow of air introduced in the contamination control system through the at least one eliminator; a filter for recovering the photocatalyst in the circulating water that is discharged from the water circulation tank, a pH control unit including an ion exchanger for controlling the pH of the circulating water; and a organic removal unit including an organic resin for removing an organic substance in the circulating water.

4. The contamination control system of claim 3, wherein the at least one nozzle comprises a plurality of nozzles disposed in a zigzag pattern and wherein the photocatalyst absorbs a light to create an active species including an electron and a hole, the active species dissolving the contaminants.

5. A contamination control system comprising:
   a spray unit having at least one nozzle for spraying circulating water;
   at least two eliminators for trapping the circulating water that captures contaminants in a flow of air and for dropping the circulating water including the contaminants into a tank; and
   a water circulation unit for providing the circulating water that includes an additive for controlling a pH of the circulating water to the spray unit, and wherein the at least two eliminators are disposed in a row in a stacked arrangement adapted to form a vortex in the flow of air introduced into the contamination control system between the at least two eliminators.

6. The contamination control system of claim 5, wherein the at least one nozzle comprises a plurality of nozzles disposed in a zigzag pattern and wherein the additive comprises a photocatalyst that absorbs a light to create an active species including an electron and a hole, the active species dissolving the contaminants.

7. The contamination control system of claim 6, further comprising a filter for recovering the photocatalyst in the circulating water that is discharged from the water circulation tank, a pH control unit including an ion exchanger for controlling the pH of the circulating water, and a organic removal unit including an organic resin for removing an organic substance in the circulating water.

8. A contamination control system comprising:
   a spray unit having at least one nozzle for spraying circulating water;
   at least one eliminator for trapping the circulating water that captures contaminants in a flow of air and for dropping the circulating water including the contaminants into a tank;
   a water circulation unit adapted for providing the circulating water that includes an additive comprising a photocatalyst for controlling a pH of the circulating water to the spray unit, and wherein the water circulation unit recycles at least a portion of the circulating water dropped into said tank back to the spray unit for at least one more use;
   a filter for recovering the photocatalyst in the circulating water that is discharged from the water circulation tank; a pH control unit including an ion exchanger for controlling the pH of the circulating water; and a organic removal unit including an organic resin for removing an organic substance in the circulating water.

9. A contamination control system comprising:
   a spray unit having at least one nozzle for spraying circulating water;
   at least one eliminator for trapping the circulating water that captures contaminants in a flow of air and for dropping the circulating water including the contaminants into a tank;
   a water circulation unit adapted for providing the circulating water that includes an additive comprising a photocatalyst for controlling a pH of the circulating water to the spray unit;
   a filter for recovering the photocatalyst in the circulating water that is discharged from the water circulation tank; and at least one of a pH control unit including an ion exchanger for controlling the pH of the circulating water or a organic removal unit including an organic resin for removing an organic substance in the circulating water.

10. The contamination control system of claim 9, wherein the contamination control system includes the pH control unit.

11. The contamination control system of claim 9, wherein the contamination control system includes the organic removal unit.

12. The contamination control system of claim 9, wherein the contamination control system includes both the pH control unit and the organic removal unit.

13. The contamination control system of claim 9, wherein the photocatalyst absorbs a light to create an active species including an electron and a hole, the active species dissolving the contaminants.

14. The contamination control system of claim 13, wherein the photocatalyst comprises at least any one selected from the group consisting of zinc oxide (ZnO), cadmium sulfide (CdS), tungsten trioxide ($WO_3$) and titanium dioxide ($TiO_2$).

15. The contamination control system of claim 13, wherein the tank is a water circulation tank included in the water circulation unit for storing the water in which the photocatalyst and the contaminants are included.

16. The contamination control system of claim 15, further comprising a water supply tank for providing additional water and an additional photocatalyst to the water circulation tank through a water supply line.

17. The contamination control system of claim 16, wherein an amount of the additional water is below about 10% of that of the circulating water in the water circulation tank.

18. The contamination control system of claim 9, wherein the circulating water is sprayed using an ultrasonic or a pressure applied to the at least one nozzle.

19. The contamination control system of claim 9, wherein the at least one nozzle comprises a plurality of nozzles having a hollow cone shape for forming a vortex in the circulating water.

20. The contamination control system of claim 9, wherein the at least one nozzle comprises a plurality of nozzles disposed in a zigzag pattern.

21. The contamination control system of claim 9, wherein a direction of the sprayed circulating water is substantially identical, opposite or perpendicular to a direction of a flow of the air in the contamination control system.

22. The contamination system of claim 9, further comprising an ultraviolet sterilizing unit for sterilizing the circulating water.

* * * * *